Feb. 22, 1927.

R. T. HAZELTON 1,618,825

PRESS BRAKE

Filed July 30, 1924   6 Sheets-Sheet 1

INVENTOR:
Robert T. Hazelton
BY Allen & Allen
ATTORNEYS.

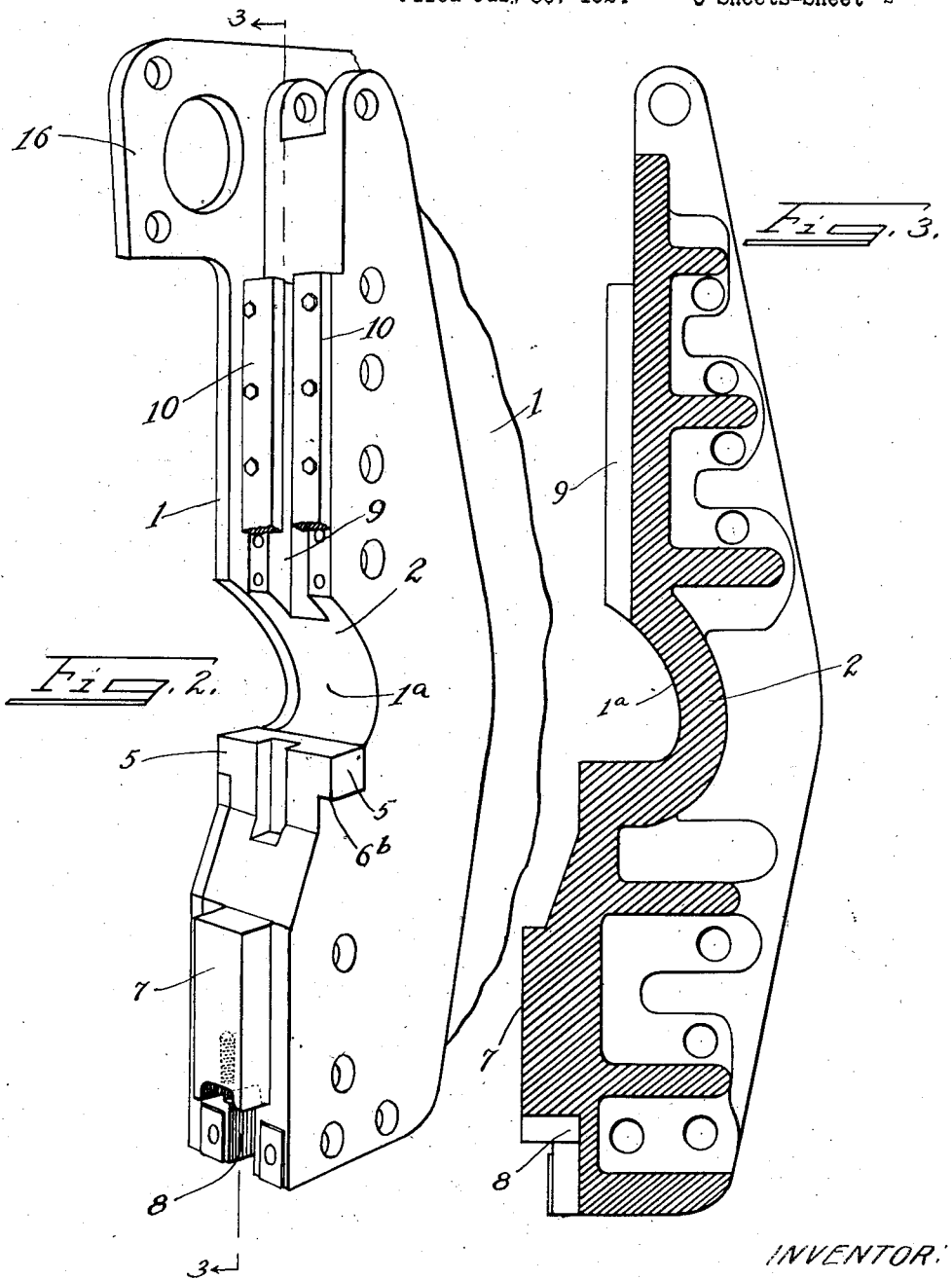

Feb. 22, 1927. 1,618,825
R. T. HAZELTON
PRESS BRAKE
Filed July 30, 1924 6 Sheets-Sheet 3
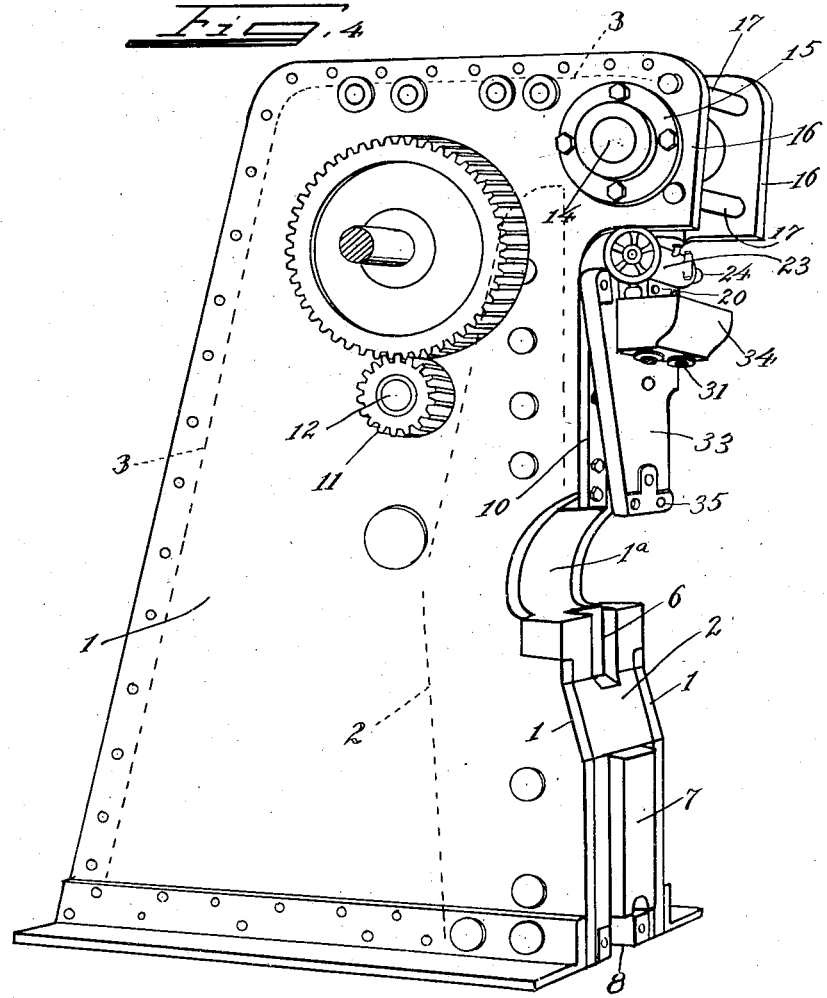
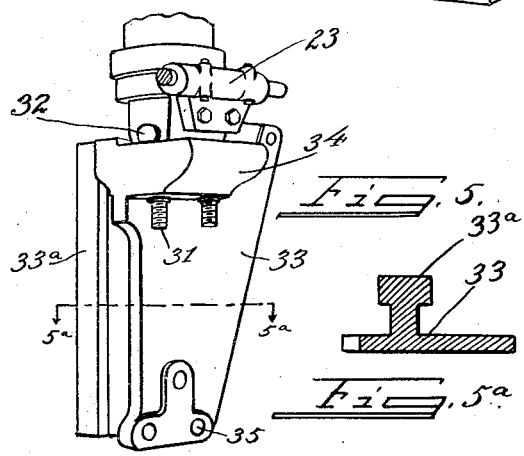
INVENTOR:
Robert T. Hazelton
BY
ATTORNEYS.

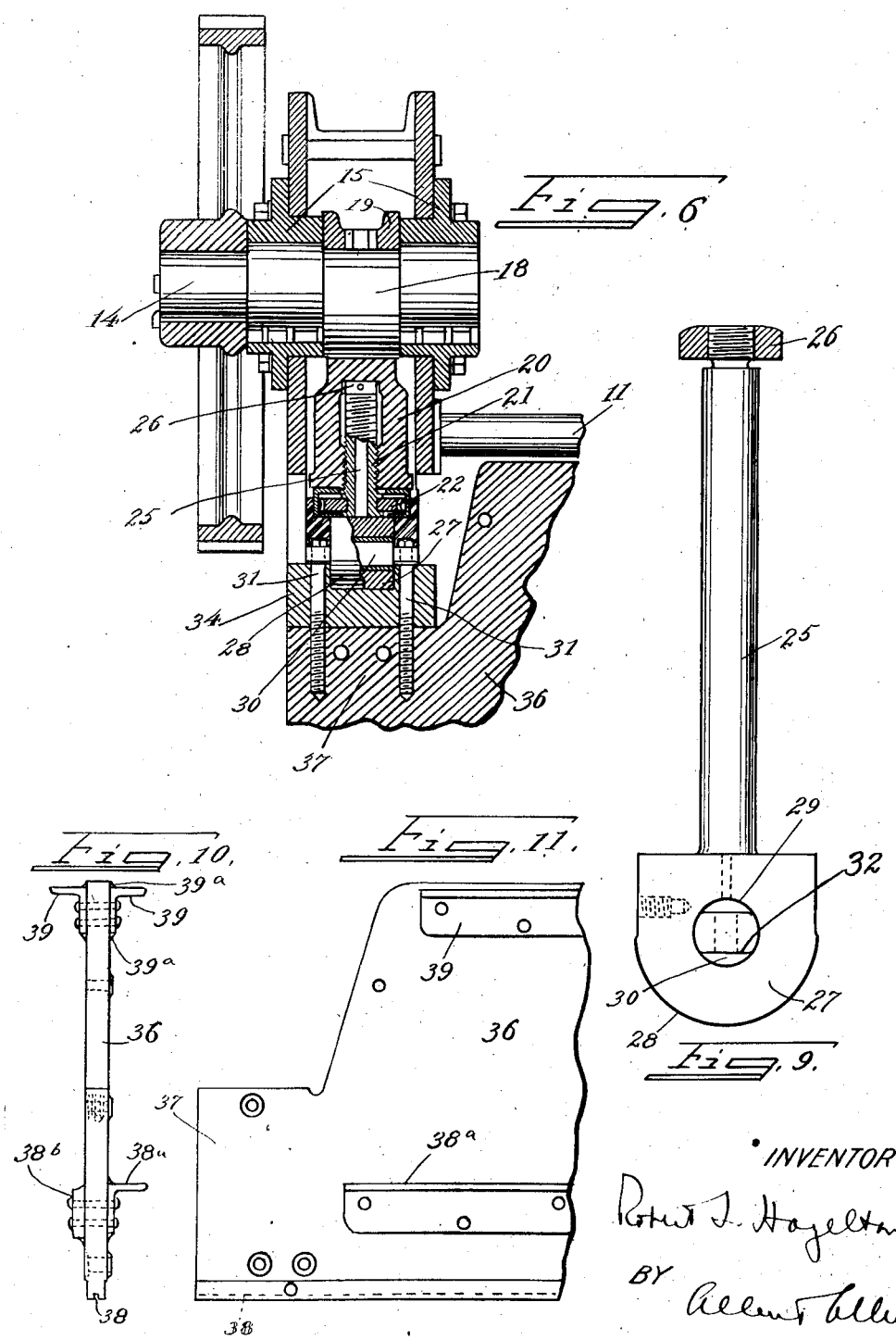

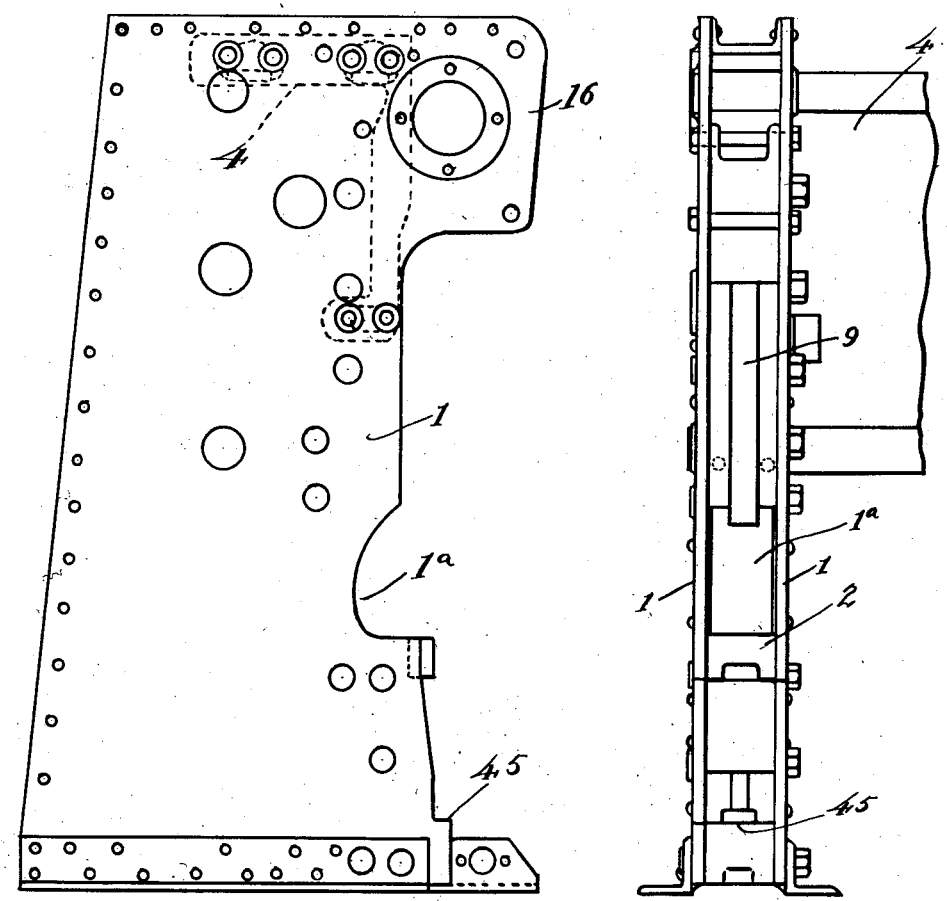
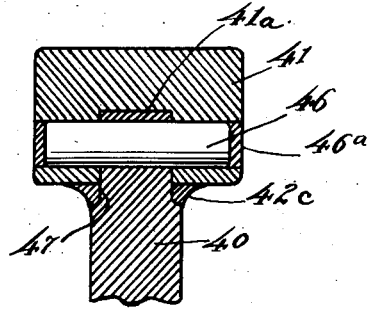

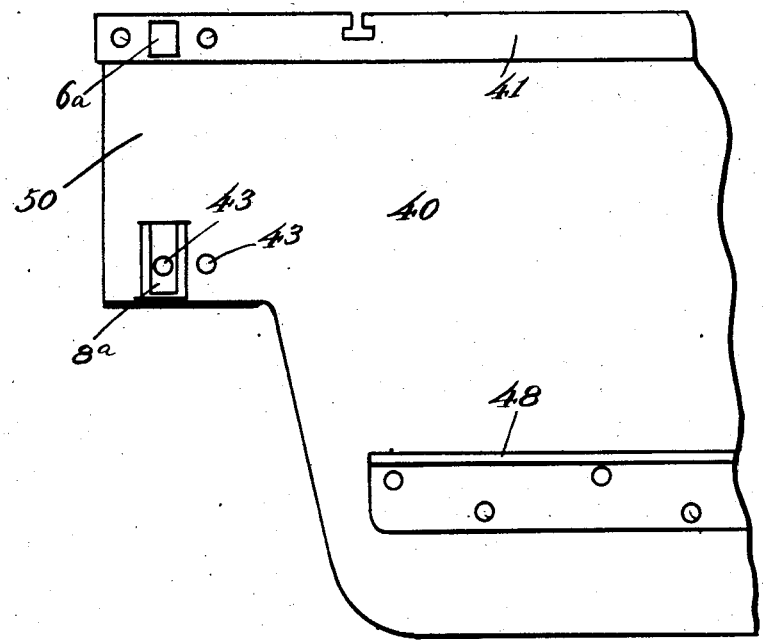
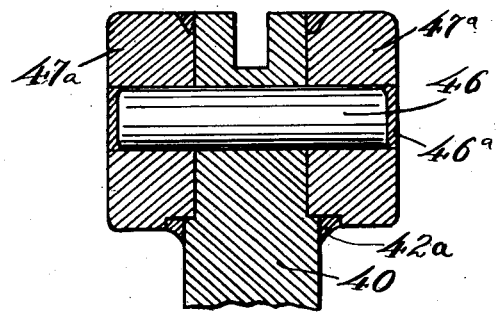

Patented Feb. 22, 1927.

1,618,825

UNITED STATES PATENT OFFICE.

ROBERT T. HAZELTON, OF CINCINNATI, OHIO, ASSIGNOR TO THE CINCINNATI SHAPER COMPANY, OF CINCINNATI, OHIO, A CORPORATION OF OHIO.

PRESS BRAKE.

Application filed July 30, 1924. Serial No. 729,184.

My invention relates to press brakes and power presses generally, which are used for bending and otherwise forming up of pieces of metal.

It has been generally true of press brakes in the past, that their size and weight have been considerably out of line with economy, or else they have not been of sufficient strength to withstand the strains attendant upon metal bending operations without distortion.

It is the primary object of my invention to provide a press brake which is formed of steel, thereby possessing greater strength to withstand strains than prior structures of cast iron, and an attendant object has been to provide a machine of minimum practical weight, with all the strength and power that maximum demands could place upon it.

It is my object to provide for a ram and bed so formed and supported and operated that deflection under load is greatly reduced over machines of like type in use.

It is my object to so arrange for the support and operation of the ram and bed, and for their relation to the housings, to permit of open throated housings, so that the effective length of the ram and bed is as great as the outside distance between the housings. Also in this connection it is my object to provide for full clearance between the housings so that work can be passed through between them.

The construction of my machine is such that the heavy top member connecting the housings, from which in former machines the thrust on the ram was taken up, is eliminated thereby greatly cutting down weight, and head room.

Instead of this top member, I take the load of the ram on bearings located in the housings themselves and apply the force to the ram at the ends, thereby clearing away a great deal of extra mechanism found in devices of the past, and obtaining greater strength and rigidity. Preferably I form the ram with greater height between the housings than at the point of application of force, thereby overcoming tendency to bending of the ram between its ends.

My construction adapts itself most excellently to shipping in sections, and setting up in the shop of the customer and it has been one of my objects to so construct the machine that it is selfaligning in being set up, and in which the mechanism, being located in the housings, is shipped completely installed.

I have improved upon the ram raising and lowering devices, and their adjustment, and by locating the working line of the machine well in advance of the mechanical parts as well as below them, I provide a greater factor of safety than has hitherto been found in machines of the type in question.

I accomplish the objects above stated and other avantages to be noted by that certain construction and arrangement of parts to be hereinafter more specifically pointed out and claimed.

In the drawings:

Figure 2 is a perspective of one of the housings.

Figure 3 is a section on the line 3—3 of Figure 2.

Figure 4 is a perspective view of one of the housings with the brake beam operating element in place.

Figure 5 is a perspective view of one of the ram slides to which the ram itself is bolted. Figure $5^a$ is a cross section of the ram slide on the line $5^a$, $5^a$ of Figure 5.

Figure 6 is a detail vertical section taken through one of the operating eccentrics, showing the ram adjustment feature.

Figure 7 is a side elevation of a housing of another type illustrating my invention.

Figure 8 is a front elevation of the part shown in Figure 7.

Figure 9 is a side elevation of the adjustable eccentric arm.

Figure 10 is an end elevation of a ram.

Figure 11 is a rear elevation thereof.

Figure 12 is a detail section of the top of a bed.

Figure 13 is a rear elevation thereof.

Figure 14 is a modification of Figure 12.

Figure 1:
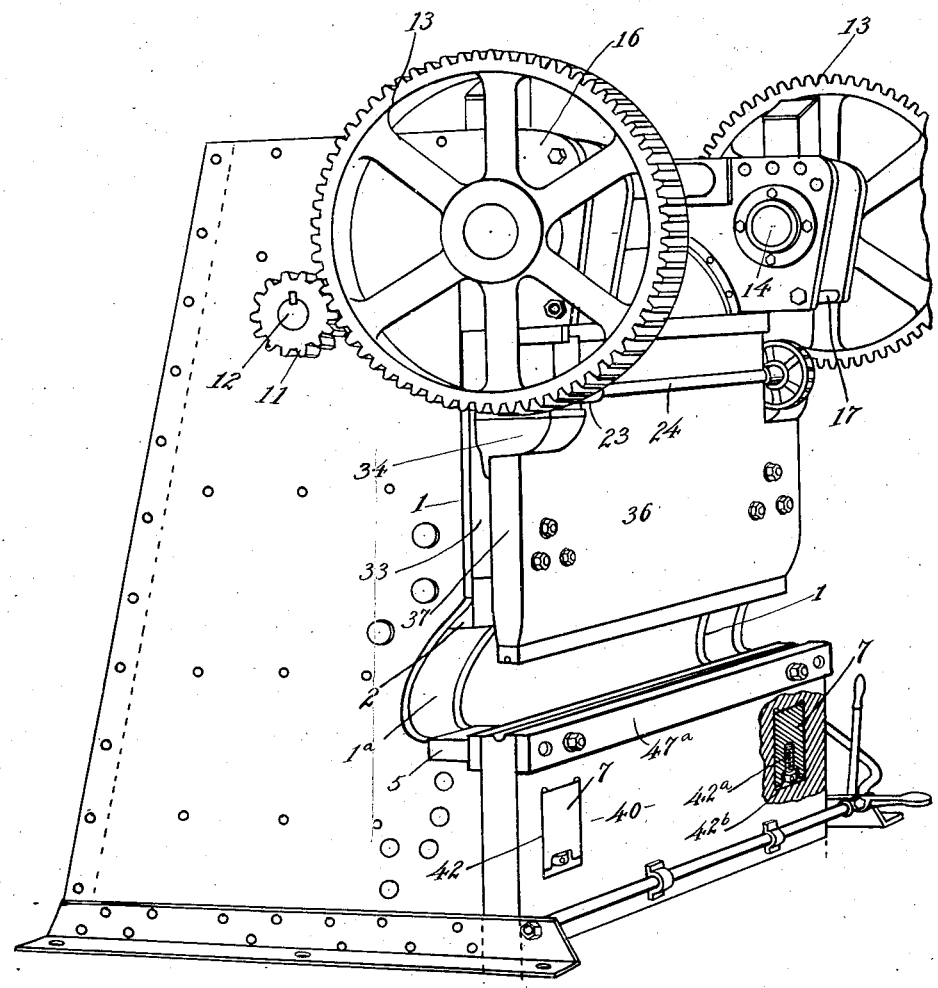
Figure 1 is a perspective view of one style of steel press brake embodying my invention.

In forming the housings, of which there are two, I provide for each housing a pair of large heavy steel plates 1, 1, of sufficient width to withstand the tremendous strains thereon, and along the front of the pairs of plates I secure firmly in place by pinning, welding, riveting or bolting, the cast steel pillars 2. Thus the standards are hollow except at the front where the entire face is practically a single piece of solid steel. I have indicated metal plates at 3, closing the housings along the back and top. These plates are firmly riveted or welded into place to hold the plates 1, 1, in their correctly spaced relation and to strengthen the assembly. It may be observed that by this construction I have provided for housings which are lighter than the tremendous A-castings of the past, and possess greater strength, and in which solid steel is provided where necessary and omitted where not necessary.

The housings are connected together across the top by an L-shaped metal plate 4, which serves as a spacer and also takes up twisting strains in two directions. It has no function in taking up the thrust on the ram itself.

The housings in all forms have open throats, or recesses at $1^a$, just above the top of the supporting face of the bed.

In the form shown in Figures 2 and 3, the pillars 2 are formed with integral flanged blocks 5, which rest on shoulders $6^b$ formed in the plates 1, 1. These blocks are cut out to form keyway 6, and the pillars are also provided with a heavy rectangular projecting lug 7 beneath which are other keyways 8.

A groove 9 is cut out and planed, for the ram slide elements in the pillars 2 of each housing, and face plates 10, 10, bolted each side of the groove and overhanging it forms for each housing a dovetailed groove in which the ram slides move up and down.

I will not describe the clutch, power receiving elements and the like, which may be of any desired type. There are two large gears 11, connected across between the housings by a shaft 12, which shaft is removably held in place in any desired way so that it can be removed and replaced for shipping and re-erection. The gears 11, which operate in unison on the said shaft 12, mesh with the bull wheels 13, 13, of which there is one located on the outside of each housing. The axles 14 of the bull wheels are provided with special bearings 15, in each of the two plates 1, forming the outside of the housing in which each axle is mounted, and the plates 1 are projected forward from the steel pillars, as indicated at 16, to permit the eccentrics to clear the pillars. Added connecting bolts 17 connect the extensions 16, to give added strength at this point.

The axles 14 are formed with eccentrics 18 thereon, over which are set eccentric straps 19, which are of very heavy construction and terminate below the axles in internally threaded tubular sockets 20. Into these sockets are set large hollow screws 21, which have worm wheels 22 shrunk thereon, said worm wheels being meshed with worms (not shown) located in boxes 23. A shaft 24 connects the worms and by this means the two screws 21 can be revolved to change their position in the sockets of the eccentric straps in unison.

Large rocking ram operating devices are provided which have shanks 25 extending up through the screws 21 and held rotatably therein by nuts 26, so that the said devices move up and down with the hollow screws. The heads of the said devices as indicated at 27 are formed with curved faces 28, and with a hole 29, wherein they are journaled on pins 30.

The pins 30 are of very heavy construction and are held to the ram slides by means of pairs of heavy bolts 31 which pass down through the tops of the slides, and through flattened ends 32 of the pins 30. Thus the pins lie flat on the slides saving space and cost and permitting adjustment by shimming.

The slides 33 are formed with dovetails $33^a$, to slide in the groove 9 for each housing. They have projecting heads 34, which have half cylinder sockets formed in the tops thereof, into which the curved faces 28 of the ram operating devices find a seat. The flat ends of the pins 30 find flat seats at both sides of the sockets in the heads 34, and the bolts, as has been stated, pass down through the heads, and also into the ram itself.

By this construction a simple adjustment for the ram slides is provided, and very great strength, without sacrifice of full ability to rock to and fro, is provided for the eccentric operating elements.

The slides are made with considerable height, and provided with bolt holes 35, by means of which the ram is bolted into place, said ram also abutting against the shoulders formed by the heads of the slides, and receiving the bolts 31.

The ram 36 as shown, is cut down in height at the ends, as at 37, where it is secured to the two slides, but between the slides and clear across the machine, the ram extends well up above the point of application of force by the eccentric operating devices.

The ram 36 is formed of a single plate of heavy steel, which is formed at its lower edge with a groove 38, by means of which the particular die that it used is set and clamped by means of bolts which compress the walls of the groove. Also mounted on the top faces of the ram plate are angle bars 39, which have one face held in place with rivets and also welded as at $39^a$, along the top and bottom edges.

There is also an angle bar $38^a$, mounted near the lower edge of the main plate, and in some cases, the face of the plate opposite to the bar $38^a$ is reinforced with a bar $38^b$, riveted with the angle bar, and also welded. The bar $38^b$ is omitted in smaller sizes of the machine.

The result of the structure described, is to provide a very stiff structure, protected from twisting strains by means of the angle bars, more practical and economical than cast steel structures in which the reinforcing webs are integral, and a considerable advance in machine tool construction in the particular class in question.

It is evident that the application of force to the ram at the ends permits of greater height of the ram consistent with general head room of the machine than would be practical in brakes which apply force to the ram intermediate its ends. At the same time the internal height of the ram provides against the bending thereof under strains, without calling upon the general framework of the machine to provide for this.

The distribution of metal in the ram thus saves expense while providing a very stiff and rigid structure along the exact lines wherein this is desired, and not elsewhere. The provision of the eccentric devices between the housing forming plates is so rigid a structure, that no strains to be encountered in the line of work of such machines, can have any effect upon it. Furthermore, as has been pointed out, the structure is economical and much lighter than prior constructions in which the bending strains on the ram, and the thrust encountered along the lines of application of force, all had to be met by the top cross members of the framework of the press brake machine.

In forming the bed of the machine, I have resorted to a somewhat similar plan of support with like results. Thus the bed is formed as a heavy plate of steel 40 upon the top of which is permanently secured, as practically one piece, a steel billet 41, grooved at 41ª, to provide for the reception of the forming edge of the ram.

I have shown two forms of bed and support therefor, in both of which instances the support is at the housings, on the plates and pillars forming the same.

In the very large machines, the beds are formed with holes 42 to fit loosely over the heavy lugs 7 on the two pillars, except at the top.

The lugs have set into a hole therein a heavy bolt 42ª which has a notched head 42ᵇ that is exposed at the front of the bed. This bolt is turned down in the lug, and thereby the bed is held down tightly on the top of the lug, by the head engaging with the base of the hole in the bed.

The bed is rectangular in shape instead of being deeper in the middle than at the ends. The inside face of the bed at the two ends is provided with welded keys 6ª and 8ª, matching with the key ways 6 and 8 in the pillars.

The provision of keys to fit the key ways, thus provides an aligning feature for the bed, and at the same time an aligning and spacing feature for the two housings in erecting them. In practice the bed is placed and aligned and the key plates are then inserted into the key ways and tacked by partial welding to the bed. The bed is then carefully removed, the keys thereby made available to be welded permanently in place, whereupon the bed may be shipped separate from the housings. In erecting since the keys are in place, in the bed, the bed is set over the supporting lugs, with the keys in the key-ways after which it is bolted into place, as by bolts 43, entering sockets in the steel pillars.

In the other form of bed support, the housing pillars are formed with keyways 6 in the lower projecting ends of the open throats of the housings, as before, and near the forward lower ends, there is formed a shoulder 45, extending across the face of each of the housings.

The bed in this form is provided with ends 50, which rest on the shoulders 45, and the bed, for the remainder of its width, is much deeper than at the said ends 50. The shoulders 45 are cut with the lower keyways 8, as in the first instance and the ends 50 of the beds are provided with keys to match, said keys serving as before in aligning, and stiffening the transverse components of the assembly. The bed is bolted against the faces on the pillars, after being set into place and keyed.

In this second instance, which will serve for all but the very heaviest brakes, the depth of the bed, aside from its depth at the point of attachment to the housings, provides against distortion by bending, using the housings for the reception of the direct force applied by the eccentric devices.

The particular constructions of the beds vary as to the depth of the body plate, making them up, but in general make-up otherwise they embody like novel principles, along the same lines as the ram. In each case the bed is formed of a heavy plate of steel 40, as has been recited. The steel billet 41 is mounted on the top edge of the plate to give a wider support than would be within practical ranges of plate width, and in the preferred form is mortised to fit over the top edge of the plate, as at 41ª, and is held in place by welding at 42ᶜ along the lower edges, and is also held in place by heavy pins 46, set through holes in the two members and welded in place at 46ª. The top edge of the plate is recessed slightly as at 47, to provide a better pocket for the weld.

Where the tables are very thick (Figure 14) two plates 47ª are used instead of the billet.

Mounted, preferably, at a point where they will close the opening in the floor, within which the bed projects, are angle bars 48, secured by riveting and welding as in the instance of the ram. The same factors of economy and strength apply to the structure of the bed as to that of the ram.

The operation and work of the machine is given great latitude, because of the fact that the bed extends clear across the face of the machine, and relies upon its own depth against bending, while withstanding the thrusts of the work done, while being supported on the practically solid steel faces of the housings at its ends. This, together with the open throats of the housings, permits of any part of the entire overall width of the machine being used for work, except where the piece is so long that it must be passed between the housings to be acted upon.

It will be evident that the points stated as objectives for my machine are accomplished by the structures described. It will naturally be possible to follow the spirit and teachings of my invention without strict following of the details noted by me, and I do not wish to be limited in the construction of my claims that follow because of the omission to mention the several equivalents for the parts named and above described. It might be noted that in some presses the ram moves upwardly, and the bed is above it stationary, and that by the terms "ram" and "bed" herein, we refer to the driven member as the "ram," and the fixed or adjustable member as the "bed."

Having thus described my invention, what I claim as new and desire to secure by Letters Patent, is:—

1. In a press brake the combination with a pair of composite housings each formed of steel plates, filler elements secured together with the plates so as to form composite unitary columnar elements, a bed secured to the said housings, a ram mounted across between said housings, said steel plates of each housing having portions extending over the bed beyond the filler means so as to clear the same, and elements mounted between the said portions of each housing and connected to the ram for operating the same.

2. In a press brake the combination with a pair of housings each formed of steel plates, filler elements secured together with the plates so as to form composite unitary columnar elements, a bed mounted against the forward edges of said housings, and interengaging means on the filler elements and the bed, whereby the bed is supported and aligned with relation to the housings.

3. In a press brake the combination with a pair of composite housings each formed of steel plates, filler elements secured together with the plates so as to form composite unitary columnar elements, a bed secured to the said housings, a ram mounted across between said housings, said steel plates of each housing having overhanging portions extending beyond the filler means and across the vertical plane of the bed and elements mounted between the said portions of each housing and connected to the ram for operating the same, said elements being formed of eccentrics journaled in each of the plates of each housing, and having straps connected to the ram.

4. A press brake having a housing and a ram, a thrusting means, a member operated thereby, said member having a cylindrical face, with a cylindrical socket in the ram for receiving the face, and means for securing said member to the ram comprising a pin having flat ends with bolts passing through the ends of the pin and into the ram for securing the pin to the ram, whereby the wear of the cylindrical face may be equalized by control of the position of the pin with relation to the ram.

5. In a press brake the combination with a pair of housings each formed of steel plates, filler elements secured together with the plates so as to form composite unitary columnar elements, a bed mounted at the forward faces of said housings, and means interengaging between the filler elements at the forward faces of the housings and the bed, whereby the bed is supported and aligned with relation to the housings, said interengaging means comprising keyways on one of said parts and keys on the other.

6. A press brake having housing, and a bed secured near the forward edges thereof, interspaced webs extending from the housings over and above the bed, forming bifurcated elements for each housing, driving means for said brake, and driven means located between the bifurcated elements of each housing, a ram movable vertically along said housings, and connections from said driven means to the ram to operate the same.

7. A press brake having housings, and a bed secured near the forward edges thereof, interspaced webs extending from the housings over and above the bed, forming bifurcated elements for each housing, and operating means located between the bifurcated elements of each housing, a ram movable vertically along said housings, and connections from said means to the ram to operate the same, said ram being formed with a median portion extending upwardly across the space between the housings, and reduced only at the ends where it is engaged by said connections.

8. A press brake having a pair of housings, a drive for ram operation mounted on each housing, and comprising gearing and a thrust member to engage the ram, whereby each housing is an independent mechanism, a removable shaft for securing said mechanisms together for conjoint operation, a ram, and a bed, and means on the ram and bed and on each housing enforcing alignment of the housings, ram and bed when the same are erected at a point for use.

9. A press brake having interspaced housings, and a bed secured at the forward faces of the housings, members extending forwardly from the faces of both the housings, lateral projections on the bed at the upper portion thereof arranged to engage over said members so as to be supported by them as a shoulder, said bed being formed with a greater height than the said projections at the portions thereof between the housings so as to depend below the level of the projections intermediate the housings.

10. A press brake having housings formed of steel plates secured together and filler elements so as to form composite unitary columnar elements, said filler elements including for each housing an integral metal block extending along the forward face of each housing, a ram and a bed, and interengaging means between the ram and bed and said integral metal blocks at each housing face.

11. In a press brake, housings, having operating mechanism for a ram mounted to move parallel to the vertical central plane of the housings, slides mounted on the housings so as to move up and down thereon, said operating mechanism connected to the slides along the central vertical plane of the slides and their path of movement and a ram extending across between the housings and secured to said slides.

12. In a press brake the combination of a pair of housings each formed of spaced plates and spacing means therefor held together to form unitary columns, a bed and a ram, the latter mounted to move with relation to the housings, and means for operating the ram located between the plates of each housing, and so positioned and mounted substantially as to balance the thrust of operation substantially equally between said plates of each housing, said ram and bed being located forwardly of the central vertical cross plane of the brake, and the plates forming the housings extending transverse the direction in which the ram extends.

13. In a press brake the combination of a housing formed of metal plates and spacing means, the plates held together over the spacing means to form a unitary column, said housing adapted for use with another housing in said brake, a ram mounted so as to move with relation to the housing in a vertical direction, and extending horizontally in a direction transverse the direction of extension of the plates, means secured to the ram and secured between the plates for moving the ram, and an operating device for the same, said means being so related to the ram and the plates of the housing as to distribute the thrust in part to each plate, and a bed also secured with relation to said housing, said bed and ram and the housing so arranged that available portions of the ram and bed extend laterally into a space beyond the line of one plate of the housing if said line were projected.

ROBERT T. HAZELTON.